United States Patent
Iwanaga et al.

(10) Patent No.: US 10,870,105 B2
(45) Date of Patent: *Dec. 22, 2020

(54) METATITANIC ACID PARTICLES, METHOD FOR PRODUCING METATITANIC ACID PARTICLES, AND COMPOSITION FOR FORMING PHOTOCATALYST

(71) Applicant: FUJI XEROX CO., LTD., Tokyo (JP)

(72) Inventors: Takeshi Iwanaga, Kanagawa (JP); Hideaki Yoshikawa, Kanagawa (JP); Hiroyoshi Okuno, Kanagawa (JP); Yasunobu Kashima, Kanagawa (JP); Sakae Takeuchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 104 days.

This patent is subject to a terminal disclaimer.

(21) Appl. No.: 15/666,861

(22) Filed: Aug. 2, 2017

(65) Prior Publication Data

US 2018/0280953 A1 Oct. 4, 2018

(30) Foreign Application Priority Data

Mar. 29, 2017 (JP) ................. 2017-065372

(51) Int. Cl.
| | | |
|---|---|---|
| *B01J 31/38* | (2006.01) | |
| *C07F 7/28* | (2006.01) | |
| *B01J 37/08* | (2006.01) | |
| *B01J 35/00* | (2006.01) | |
| *B01J 31/14* | (2006.01) | |
| *B01J 31/12* | (2006.01) | |
| *B01J 31/02* | (2006.01) | |
| *B01J 21/06* | (2006.01) | |

(52) U.S. Cl.
CPC ............ *B01J 31/38* (2013.01); *B01J 31/12* (2013.01); *B01J 31/143* (2013.01); *B01J 35/004* (2013.01); *B01J 37/08* (2013.01); *C07F 7/28* (2013.01); *B01J 21/063* (2013.01); *B01J 31/0274* (2013.01); *B01J 2531/46* (2013.01)

(58) Field of Classification Search
None
See application file for complete search history.

(56) References Cited

U.S. PATENT DOCUMENTS

| | | | |
|---|---|---|---|
| 5,411,761 A | 5/1995 | Inokuchi et al. | |
| 5,965,312 A * | 10/1999 | Nakazawa | G03G 9/09708 430/108.6 |
| 10,155,220 B2 * | 12/2018 | Kashima | B01J 35/004 |
| 10,183,275 B2 * | 1/2019 | Okuno | B01J 21/063 |

FOREIGN PATENT DOCUMENTS

| | | | |
|---|---|---|---|
| JP | H05-221640 A | | 8/1993 |
| JP | 2001-269573 A | | 10/2001 |
| JP | 2004-115541 A | | 4/2004 |
| JP | 2007-016111 A | | 1/2007 |
| JP | 2010-006629 A | | 1/2010 |
| JP | 2010078861 | * | 4/2010 |
| JP | 2016148786 | * | 8/2016 |

OTHER PUBLICATIONS

A machine translation of JP 2010-078861 (Year: 2010).*
A machine translation of JP 2016-148786 (Year: 2016).*

* cited by examiner

*Primary Examiner* — Yun Qian
(74) *Attorney, Agent, or Firm* — Oliff PLC

(57) ABSTRACT

Metatitanic acid particles have absorption at wavelengths of 450 nm and 750 nm in a visible absorption spectrum, have a surface to which a metal compound having a metal atom and a carbon atom is bonded through an oxygen atom, and satisfy the following inequality: $0.03 \le A \le 0.3$, wherein A represents a value of {(peak intensity of C—O bond+peak intensity of C=O bond)/(peak intensity of C—C bond+peak intensity of C=C bond} in a C 1s XPS spectrum.

17 Claims, No Drawings

METATITANIC ACID PARTICLES, METHOD FOR PRODUCING METATITANIC ACID PARTICLES, AND COMPOSITION FOR FORMING PHOTOCATALYST

CROSS-REFERENCE TO RELATED APPLICATIONS

This application is based on and claims priority under 35 USC 119 from Japanese Patent Application No. 2017-065372 filed Mar. 29, 2017.

BACKGROUND

Technical Field

The present invention relates to metatitanic acid particles, a method for producing the metatitanic acid particles, and a composition for forming a photocatalyst.

SUMMARY

According to an aspect of the invention, there are provided metatitanic acid particles having absorption at wavelengths of 450 nm and 750 nm in a visible absorption spectrum, having a surface to which a metal compound having a metal atom and a carbon atom is bonded through an oxygen atom, and satisfying the following inequality:

$$0.03 \leq A \leq 0.3$$

wherein A represents a value of {(peak intensity of C—O bond+peak intensity of C=O bond)/(peak intensity of C—C bond+peak intensity of C=C bond} in a C 1s XPS spectrum.

DETAILED DESCRIPTION

An exemplary embodiment of the invention will now be described. The description and examples below are illustrative of the exemplary embodiment and are not intended to limit the scope of the invention.

In the present disclosure, if there are two or more substances corresponding to one component in a composition, the amount of the component in the composition refers to the total amount of the two or more substances in the composition, unless otherwise specified.

XPS is an abbreviation of X-ray Photoelectron Spectroscopy.

Metatitanic Acid Particles

Metatitanic acid particles of the exemplary embodiment have a surface to which a metal compound having a metal atom and a carbon atom is bonded through an oxygen atom, satisfies {(peak intensity of C—O bond+peak intensity of C=O bond)÷(peak intensity of C—C bond+peak intensity of C=C bond)}=0.03 to 0.3 in a C 1s XPS spectrum, and have absorption at wavelengths of 450 nm and 750 nm in a visible absorption spectrum.

In the present disclosure, {(peak intensity of C—O bond+peak intensity of C=O bond)÷(peak intensity of C—C bond+peak intensity of C=C bond)} in a C 1s XPS spectrum is referred to as an "XPS peak intensity ratio of C 1s". The XPS peak intensity ratio of C 1s indicates the degree of oxidation of a metatitanic acid particle surface.

The C 1s XPS spectrum is measured with an X-ray photoelectron spectrometer (e.g., a VERSA PROBE II available from Ulvac-Phi, Incorporated) using AlKα radiation as an X-ray source at an X-ray beam power of 25 W and 15 kV.

In a C 1s XPS spectrum, multiple peaks appear according to the state of bonding of carbon atoms, and the peaks are each assigned according to their chemical shift position. In the exemplary embodiment, a peak that appears in the range of 285.5 eV to 287 eV is determined to be a peak of a C—O bond, a peak that appears in the range of 287 eV to 288 eV to be a peak of a C=O bond, a peak that appears in the range of 284 eV to 285.5 eV to be a peak of a C—C bond, and a peak that appears in the range of 284.5 eV to 285 eV to be a peak of a C=C bond. Here, the peak of a C—O bond and the peak of a C=O bond need not necessarily be separated from each other, and the peak of a C—C bond and the peak of a C=C bond need not necessarily be separated from each other. {(Peak intensity of C—O bond+peak intensity of C=O bond)÷(peak intensity of C—C bond+peak intensity of C=C bond)} is determined using one of the peak of a C—O bond and the peak of a C=O bond which is higher than the other as (peak intensity of C—O bond+peak intensity of C=O bond) and one of the peak of a C—C bond and the peak of a C=C bond which is higher than the other as (peak intensity of C—C bond+peak intensity of C=C bond).

The metatitanic acid particles of the exemplary embodiment exhibit a high photocatalytic function in the visible range. This is presumably due to the following mechanism.

The metatitanic acid particles of the exemplary embodiment are obtained by surface-treating untreated metatitanic acid particles with a metal compound having a hydrocarbon group and heat-treating the surface-treated particles so that at least some of the hydrocarbon group are oxidized to form C—O bonds or C=O bonds. Although the mechanism is not fully understood, it is presumed that since a structure in which an organometallic compound in which carbon atoms are adequately oxidized, an oxygen atom, and a titanium atom are linked in this order through covalent bonds is present on the surface of the metatitanic acid particles, the surface of the metatitanic acid particles exhibits light absorption at wavelengths of 450 nm and 750 nm, and the metatitanic acid particles exhibit visible light responsivity.

When the XPS peak intensity ratio of C 1s is less than 0.03, the degree of oxidation of the organometallic compound is excessively low, and the surface of the metatitanic acid particles may be less likely to exhibit light absorption in the visible range.

When the XPS peak intensity ratio of C 1s is more than 0.3, the heat treatment for oxidizing the organometallic compound may proceed too far, to thereby cause carbon atoms to be not only oxidized but also eliminated, and the surface of the metatitanic acid particles may exhibit insufficient light absorption in the visible range.

To more readily provide visible light responsivity, the organometallic compound bonded through an oxygen atom to the surface of the metatitanic acid particles of the exemplary embodiment are preferably a metal compound including metal, carbon, hydrogen, and oxygen atoms alone.

To more readily provide visible light responsivity, the metal compound bonded through an oxygen atom to the surface of the metatitanic acid particles of the exemplary embodiment is preferably bonded to the surface of the metatitanic acid particles through an oxygen atom O directly bonded to a metal atom M in the metal compound, that is, preferably bonded to the surface of the metatitanic acid particles via a covalent bond M-O—Ti.

For the metatitanic acid particles of the exemplary embodiment to more readily exhibit visible light responsivity, a metal compound having the carbon atom directly bonded to the metal atom is preferably bonded through an oxygen atom to the surface of the metatitanic acid particles. It is presumed that since a structure in which a carbon atom C, a metal atom M, an oxygen atom O, and a titanium atom Ti are linked in this order through covalent bonds (C-M-O—Ti) is present on the surface of the metatitanic acid particles and the carbon atom C is adequately oxidized, the surface of the metatitanic acid particles exhibits light absorption at wavelengths of 450 nm and 750 nm, and the metatitanic acid particles exhibit visible light responsivity.

The metal atom as a component of the organometallic compound bonded through an oxygen atom to the surface of the metatitanic acid particles of the exemplary embodiment, is preferably a metal atom selected from silicon, aluminum, and titanium, more preferably a metal atom selected from silicon and aluminum, particularly preferably silicon.

The metatitanic acid particles of the exemplary embodiment are favored for their high photocatalytic function in the visible range and also for the following reason.

In general, untreated metatitanic acid particles have a low degree of freedom in controlling their particle size, particle size distribution, and particle shape, and tend to be highly aggregated. Thus, such metatitanic acid particles have poor dispersibility in a resin or a liquid and have the following tendencies: 1) to be less likely to exhibit a photocatalytic function, 2) to provide a coating liquid that forms a coating having low uniformity, and 3) to provide a film or the like with low transparency.

In contrast, the metatitanic acid particles of the exemplary embodiment have on their surface a hydrocarbon group derived from a metal compound and thus has good dispersibility. This enables the formation of a substantially uniform coating, allows the metatitanic acid particles to be efficiently exposed to light, and allows the photocatalytic function to be easily exhibited. The good dispersibility also enables a film or the like with improved transparency and a coating liquid that forms a coating with improved uniformity, thus achieving high design qualities. Consequently, when a paint containing the metatitanic acid particles is applied to a surface of, for example, an external wall material, a board, a pipe, or a nonwoven fabric (a nonwoven fabric made of a ceramic or other material), the aggregation of the metatitanic acid particles or coating defects are suppressed, and the photocatalytic function tends to be exhibited over a long period of time.

The metatitanic acid particles of the exemplary embodiment will now be described in detail.

The metatitanic acid particles of the exemplary embodiment are preferably metatitanic acid particles obtained by surface-treating untreated metatitanic acid particles with a metal compound having a metal atom and a hydrocarbon group, and oxidizing at least some of the hydrocarbon group by a heat treatment. In the present disclosure, the metal compound having a metal atom and a hydrocarbon group is referred to simply as the "metal compound having a hydrocarbon group".

Untreated Metatitanic Acid Particles

In the present disclosure, metatitanic acid particles not surface-treated with a metal compound having a hydrocarbon group are referred to as "untreated metatitanic acid particles". The untreated metatitanic acid particles (metatitanic acid particles to be surface-treated) are titanic acid particles of a titanic acid hydrate represented by $TiO_2 \cdot nH_2O$ with n=1.

The untreated metatitanic acid particles in the exemplary embodiment are metatitanic acid particles not surface-treated with a metal compound having a hydrocarbon group, and the metatitanic acid particles of the exemplary embodiment are preferably metatitanic acid particles surface-treated only with a metal compound having a hydrocarbon group, although it will be appreciated that other surface treatments are not excluded.

The untreated metatitanic acid particles may be prepared by any method including a chlorine method (gas phase method) or a sulfuric acid method (liquid phase method).

The following is an example of the chlorine method (gas phase method). First, rutile ore, serving as a raw material, is reacted with coke and chlorine to form gaseous titanium tetrachloride. The gaseous titanium tetrachloride is then cooled to form liquid titanium tetrachloride. Next, the liquid titanium tetrachloride is dissolved in water, and the solution is hydrolyzed by adding a strong base thereto. As a result, untreated metatitanic acid [titanium oxyhydroxide (TiO(OH)$_2$)] particles are obtained.

The following is an example of the sulfuric acid method (liquid phase method). First, ilmenite ore ($FeTiO_3$) or titanium slag, serving as a raw material, is dissolved in concentrated sulfuric acid, and the iron component, which is an impurity, is isolated in the form of iron sulfate ($FeSO_4$) to form titanium oxysulfate ($TiOSO_4$) (titanyl sulfate solution). Next, the titanium oxysulfate ($TiOSO_4$) is hydrolyzed to obtain untreated metatitanic acid [titanium oxyhydroxide (TiO(OH)$_2$)] particles.

Metal Compound Having Hydrocarbon Group

The metal compound having a metal atom and a carbon atom, the compound being present on the surface of the metatitanic acid particles of the exemplary embodiment, is derived from the metal compound having a hydrocarbon group used for the surface treatment of the metatitanic acid particles.

The metal compound having a hydrocarbon group for use in the surface treatment of the metatitanic acid particles preferably has the hydrocarbon group directly bonded to the metal atom. When the metal compound having a hydrocarbon group has multiple hydrocarbon groups, at least one hydrocarbon group is required to be directly bonded to a metal atom of the metal compound.

Examples of the hydrocarbon group of the metal compound include saturated and unsaturated aliphatic hydrocarbon groups of 1 to 40 carbon atoms (preferably 1 to 20 carbon atoms, more preferably 1 to 18 carbon atoms, still more preferably 4 to 12 carbon atoms, yet still more preferably 4 to 10 carbon atoms) and aromatic hydrocarbon groups of 6 to 27 carbon atoms (preferably 6 to 20 carbon atoms, more preferably 6 to 18 carbon atoms, still more preferably 6 to 12 carbon atoms, yet still more preferably 6 to 10 carbon atoms).

To exhibit a high photocatalytic function and provide improved dispersibility, the hydrocarbon group is preferably an aliphatic hydrocarbon group, more preferably a saturated aliphatic hydrocarbon group, particularly preferably an alkyl group. The aliphatic hydrocarbon group may be linear, branched, or cyclic, and is preferably linear or branched from the viewpoint of dispersibility.

The metal atom of the metal compound having a hydrocarbon group is preferably a metal atom selected from silicon, aluminum, and titanium, more preferably a metal atom selected from silicon and aluminum, particularly preferably silicon. In other words, the metal compound having a hydrocarbon group is particularly preferably a silane compound having a hydrocarbon group. Examples of the silane compound having a hydrocarbon group include chlorosilane compounds, alkoxysilane compounds, and silazane compounds (e.g., hexamethyldisilazane).

To exhibit a high photocatalytic function and provide improved dispersibility, the silane compound having a hydrocarbon group for use in the surface treatment of the metatitanic acid particles is preferably a compound represented by general formula (1): $R^1{}_n SiR^2{}_m$.

In the general formula (1): $R^1{}_n SiR^2{}_m$, $R^1$ represents a saturated or unsaturated aliphatic hydrocarbon group of 1 to 20 carbon atoms or an aromatic hydrocarbon group of 6 to 20 carbon atoms, $R^2$ represents a halogen atom or an alkoxy group, n represents an integer of 1 to 3, and m represents an integer of 1 to 3, provided that n+m=4. When n is an integer of 2 or 3, the plural $R^1$ may be the same group or different groups. When m is an integer of 2 or 3, the plural $R^2$ may be the same group or different groups.

The aliphatic hydrocarbon group represented by $R^1$ may be linear, branched, or cyclic, and is preferably linear or branched from the viewpoint of dispersibility. To exhibit a high photocatalytic function and provide improved dispersibility, the number of carbon atoms in the aliphatic hydrocarbon group is preferably 1 to 20, more preferably 1 to 18, still more preferably 4 to 12, yet still more preferably 4 to 10. The aliphatic hydrocarbon group may be saturated or unsaturated. To exhibit a high photocatalytic function and provide improved dispersibility, a saturated aliphatic hydrocarbon group is preferred, and an alkyl group is more preferred.

Examples of the saturated aliphatic hydrocarbon group include linear alkyl groups (e.g., methyl, ethyl, propyl, butyl, pentyl, hexyl, heptyl, octyl, nonyl, decyl, dodecyl, hexadecyl, and icosyl groups), branched alkyl groups (e.g., isopropyl, isobutyl, isopentyl, neopentyl, 2-ethylhexyl, tertiary butyl, tertiary pentyl, and isopentadecyl groups), and cyclic alkyl groups (e.g., cyclopropyl, cyclopentyl, cyclohexyl, cycloheptyl, cyclooctyl, tricyclodecyl, norbornyl, and adamantyl groups).

Examples of the unsaturated aliphatic hydrocarbon group include alkenyl groups (e.g., vinyl (ethenyl), 1-propenyl, 2-propenyl, 2-butenyl, 1-butenyl, 1-hexenyl, 2-dodecenyl, and pentenyl groups) and alkynyl groups (e.g., ethynyl, 1-propynyl, 2-propynyl, 1-butynyl, 3-hexynyl, and 2-dodecenyl groups).

The aliphatic hydrocarbon group may be a substituted aliphatic hydrocarbon group. Examples of the substituent for the aliphatic hydrocarbon group include halogen atoms, and epoxy, glycidyl, glycidoxy, mercapto, methacryloyl, and acryloyl groups.

The aromatic hydrocarbon group represented by $R^1$ has preferably 6 to 20 carbon atoms, more preferably 6 to 18 carbon atoms, still more preferably 6 to 12 carbon atoms, yet still more preferably 6 to 10 carbon atoms.

Examples of the aromatic hydrocarbon group include phenylene, biphenylene, terphenylene, naphthalene, and anthracene groups. The aromatic hydrocarbon group may be a substituted aromatic hydrocarbon group. Examples of the substituent for the aromatic hydrocarbon group include halogen atoms, and epoxy, glycidyl, glycidoxy, mercapto, methacryloyl, and acryloyl groups.

Examples of the halogen atom represented by $R^2$ include fluorine, chlorine, bromine, and iodine. The halogen atom is preferably chlorine, bromine, or iodine.

Examples of the alkoxy group represented by $R^2$ include alkoxy groups of 1 to 10 (preferably 1 to 8, more preferably 3 to 8) carbon atoms. Examples of the alkoxy group include methoxy, ethoxy, isopropoxy, t-butoxy, n-butoxy, n-hexyloxy, 2-ethylhexyloxy, and 3,5,5-trimethylhexyloxy groups. The alkoxy group may be a substituted alkoxy group.

Examples of the substituent for the alkoxy group include halogen atoms, and hydroxyl, amino, alkoxy, amide, and carbonyl groups.

To exhibit a high photocatalytic function and provide improved dispersibility, the compound represented by the general formula (1): $R^1{}_n SiR^2{}_m$ is preferably a compound with $R^1$ being a saturated aliphatic hydrocarbon group. In particular, the compound represented by the general formula (1): $R^1{}_n SiR^2{}_m$ is preferably a compound with $R^1$ being a saturated aliphatic hydrocarbon group of 1 to 20 carbon atoms, $R^2$ being a halogen atom or an alkoxy group, n being an integer of 1 to 3, and m being an integer of 1 to 3, provided that n+m=4.

Examples of the compound represented by the general formula (1): $R^1{}_n SiR^2{}_m$ include silane compounds such as:

vinyltrimethoxysilane, methyltrimethoxysilane, ethyltrimethoxysilane, propyltrimethoxysilane, butyltrimethoxysilane, hexyltrimethoxysilane, n-octyltrimethoxysilane, decyltrimethoxysilane, dodecyltrimethoxysilane, vinyltriethoxysilane, methyltriethoxysilane, ethyltriethoxysilane, butyltriethoxysilane, hexyltriethoxysilane, decyltriethoxysilane, dodecyltriethoxysilane, phenyltrimethoxysilane, o-methylphenyltrimethoxysilane, p-methylphenyltrimethoxysilane, phenyltriethoxysilane, benzyltriethoxysilane, decyltrichlorosilane, and phenyltrichlorosilane (n=1, m=3);

dimethyldimethoxysilane, dimethyldiethoxysilane, methylvinyldimethoxysilane, methylvinyldiethoxysilane, diphenyldimethoxysilane, diphenyldiethoxysilane, dimethyldichlorosilane, and dichlorodiphenylsilane (n=2, m=2);

trimethylmethoxysilane, trimethylethoxysilane, trimethylchlorosilane, decyldimethylchlorosilane, and triphenylchlorosilane (n=3, m=1); and 3-glycidoxypropyltrimethoxysilane, γ-methacryloxypropyltrimethoxysilane, γ-mercaptopropyltrimethoxysilane, γ-chloropropyltrimethoxysilane, γ-aminopropyltrimethoxysilane, γ-aminopropyltriethoxysilane, γ-(2-aminoethyl)aminopropyltrimethoxysilane, γ-(2-aminoethyl)aminopropylmethyldimethoxysilane, and γ-glycidyloxypropylmethyldimethoxysilane (which are compounds with $R^1$ being a substituted aliphatic hydrocarbon group or a substituted aromatic hydrocarbon group).

These silane compounds may be used alone or in combination.

To exhibit a high photocatalytic function and provide improved dispersibility, the hydrocarbon group in the silane compound represented by the general formula (1) is preferably an aliphatic hydrocarbon group, more preferably a saturated aliphatic hydrocarbon group, particularly preferably an alkyl group. To exhibit a high photocatalytic function and provide improved dispersibility, the hydrocarbon group in the silane compound is preferably a saturated aliphatic hydrocarbon group of 1 to 20 carbon atoms, more preferably a saturated aliphatic hydrocarbon group of 1 to 18 carbon atoms, still more preferably a saturated aliphatic hydrocarbon group of 4 to 12 carbon atoms, particularly preferably a saturated aliphatic hydrocarbon group of 4 to 10 carbon atoms.

Examples of silane compounds other than the compound represented by the general formula (1) include tetramethoxysilane and tetraethoxysilane.

Examples of the metal compound having a hydrocarbon group with the metal atom being aluminum include alkyl aluminates such as triethoxyaluminum, tri-i-propoxyaluminum, and tri-sec-butoxyaluminum; aluminum chelates such as di-i-propoxy.mono-sec-butoxyaluminum and di-i- propoxyaluminum.ethyl acetoacetate; and aluminate coupling agents such as acetoalkoxyaluminum diisopropylate.

Examples of the metal compound having a hydrocarbon group with the metal atom being titanium include titanate coupling agents such as isopropyl triisostearoyl titanate, tetraoctyl bis(ditridecylphosphite) titanate, and bis(dioctylpyrophosphate)oxyacetate titanate; and titanium chelates such as di-i-propoxy bis(ethylacetoacetate) titanium, di-i-propoxy bis(acetylacetonate) titanium, di-i-propoxy bis(triethanolaminate) titanium, di-i-propoxy titanium diacetate, and di-i-propoxy titanium dipropionate.

These metal compounds having a hydrocarbon group may be used alone or in combination.

Characteristics of Metatitanic Acid Particles

From the viewpoint of visible light responsivity, {(peak intensity of C—O bond+peak intensity of C=O bond)÷(peak intensity of C—C bond+peak intensity of C=C bond)} in a C 1s XPS spectrum of the metatitanic acid particles of the exemplary embodiment is 0.03 or more and 0.3 or less, more preferably 0.04 or more and 0.25 or less, still more preferably 0.05 or more and 0.2 or less.

The XPS peak intensity ratio of C 1s may be controlled to be within the above range by regulating the temperature, time, and oxygen atmosphere in a heat treatment in a method for producing the metatitanic acid particles described below.

The metatitanic acid particles of the exemplary embodiment have absorption at wavelengths of 450 nm and 750 nm in a visible absorption spectrum.

To exhibit a high photocatalytic function in the visible range, the metatitanic acid particles of the exemplary embodiment preferably have absorption at wavelengths of 450 nm, 600 nm, and 750 nm in a visible absorption spectrum, more preferably have absorption over an entire wavelength range of 450 nm to 750 nm in a visible absorption spectrum, particularly preferably have absorption over an entire wavelength range of 400 nm to 800 nm in a visible absorption spectrum.

To exhibit a high photocatalytic function in the visible range, the metatitanic acid particles of the exemplary embodiment preferably have, in their ultraviolet-visible absorption spectrum, an absorbance of 0.02 or more (preferably 0.1 or more, more preferably 0.2 or more) at a wavelength of 450 nm, an absorbance of 0.02 or more (preferably 0.1 or more, more preferably 0.2 or more) at a wavelength of 600 nm, and an absorbance of 0.02 or more (preferably 0.1 or more, more preferably 0.2 or more) at a wavelength of 750 nm, the absorbance values being relative to the absorbance at a wavelength of 350 nm taken as 1.

The ultraviolet-visible absorption spectrum is obtained by the following method. Target metatitanic acid particles are dispersed in tetrahydrofuran. The dispersion is then applied to a glass substrate and dried in air at 24° C. Using a spectrophotometer (e.g., a U-4100 available from Hitachi High-Technologies Corporation: scanning speed, 600 nm; slit width, 2 nm; sampling interval, 1 nm), a diffuse reflectance spectrum in a wavelength range of 200 nm to 900 nm is measured in a diffuse reflectance configuration. From the diffuse reflectance spectrum, the absorbance at each wavelength is theoretically determined by Kubelka-Munk conversion to obtain an ultraviolet-visible absorption spectrum.

The volume-average particle size of the metatitanic acid particles of the exemplary embodiment is preferably 10 nm or more and 1 µm or less, more preferably 10 nm or more and 200 nm or less, still more preferably 15 nm or more and 200 nm or less. A volume-average particle size of 10 nm or more reduces the likelihood of aggregation of the metatitanic acid particles, leading to an improved photocatalytic function. A volume-average particle size of 1 µm or less increases the ratio of specific surface area to volume of the metatitanic acid particles, leading to an improved photocatalytic function. Therefore, the metatitanic acid particles, when having a volume-average particle size within the above range, tend to exhibit a high photocatalytic function in the visible range.

The volume-average particle size of the metatitanic acid particles is measured using a dynamic light scattering particle size analyzer (e.g., a NANOTRAC UPA-ST available from MicrotracBEL Corp.) under the measurement conditions: sample concentration, 20%; measurement time, 300 seconds. The dynamic light scattering particle size analyzer measures particle sizes using the Brownian movement of a dispersoid. The particle sizes are determined by applying a laser beam to a solution and detecting the scattered light. A particle size distribution measured by the dynamic light scattering particle size analyzer is divided into particle size sections (channels). Cumulative volume distribution of the particles is drawn from smaller particle sizes. The particle size at which the cumulative volume is 50% is defined as a volume-average particle size.

Method for Producing Metatitanic Acid Particles

A method for producing the metatitanic acid particles of the exemplary embodiment preferably, but not necessarily, includes surface-treating untreated metatitanic acid particles with a metal compound having a hydrocarbon group and heat-treating the metatitanic acid particles during or after the surface-treating of the untreated metatitanic acid particles.

Surface Treatment

Non-limiting examples of the method for surface-treating untreated metatitanic acid particles with a metal compound having a hydrocarbon group include bringing the metal compound having a hydrocarbon group into direct contact with the untreated metatitanic acid particles, and bringing a treatment solution prepared by dissolving the metal compound having a hydrocarbon group in a solvent into contact with the untreated metatitanic acid particles.

Specifically, for example, the metal compound having a hydrocarbon group or the treatment solution is added under stirring to a dispersion of the untreated metatitanic acid particles in a solvent, or the metal compound having a hydrocarbon group or the treatment solution is added (e.g., by dropping or spraying) to the untreated metatitanic acid particles fluidized, for example, by stirring with a Henschel mixer or the like. By performing any of these methods, a reactive group (e.g., a hydrolyzable group such as a halogeno group or an alkoxy group) in the metal compound having a hydrocarbon group reacts with a hydroxyl group on the surface of the untreated metatitanic acid particles, and as a result, the untreated metatitanic acid particles are surface-treated.

Examples of the solvent for dissolving the metal compound having a hydrocarbon group include organic solvents (e.g., hydrocarbon solvents, ester solvents, ether solvents, halogen solvents, and alcohol solvents), water, and mixed solvents thereof. Examples of hydrocarbon solvents include toluene, benzene, xylene, hexane, octane, hexadecane, and cyclohexane. Examples of ester solvents include methyl acetate, ethyl acetate, isopropyl acetate, and amyl acetate. Examples of ether solvents include dibutyl ether and dibenzyl ether. Examples of halogen solvents include 1,1-dichloro-1-fluoroethane, 1,1-dichloro-2,2,2-trifluoroethane, 1,1-dichloro-2,2,3,3,3-pentafluoropropane, chloroform, dichloroethane, and carbon tetrachloride. Examples of alcohol solvents include methanol, ethanol, and i-propyl alcohol. Examples of water include water, distilled water, and pure water. Other solvents such as dimethylformamide, dimethylacetamide, dimethyl sulfoxide, acetic acid, and sulfuric acid may also be used.

In the treatment solution prepared by dissolving the metal compound having a hydrocarbon group in a solvent, the concentration of the metal compound having a hydrocarbon group is preferably 0.05 mol/L or more and 500 mol/L or less, more preferably 0.5 mol/L or more and 10 mol/L or less.

To exhibit a high photocatalytic function and provide improved dispersibility, the metatitanic acid particles may be surface-treated with the metal compound having a hydrocarbon group under the following conditions. The untreated metatitanic acid particles may be surface-treated with the metal compound having a hydrocarbon group in an amount of 10 mass % or more and 100 mass % or less (preferably 20 mass % or more and 75 mass % or less, more preferably 25 mass % or more and 50 mass % or less) based on the amount of the untreated metatitanic acid particles. Not less than 10 mass % of the metal compound having a hydrocarbon group readily provides a high photocatalytic function in the visible range and improved dispersibility. Not more than 100 mass % of the metal compound having a hydrocarbon group inhibits an excess of metal derived from the metal compound having a hydrocarbon group from being present on the surface of the metatitanic acid particles, thus suppressing the decrease in photocatalytic function that might otherwise be caused by an excess of metal.

The temperature of the surface treatment of the untreated metatitanic acid particles with the metal compound having a hydrocarbon group is preferably 15° C. or higher and 150° C. or lower, more preferably 20° C. or higher and 100° C. or lower. The time of the surface treatment is preferably 10 minutes or longer and 120 minutes or shorter, more preferably 30 minutes or longer and 90 minutes or shorter.

After the surface treatment of the untreated metatitanic acid particles with the metal compound having a hydrocarbon group, a drying treatment may be performed. The drying treatment may be performed by any known drying method such as vacuum drying or spray drying. The drying is preferably performed at 20° C. or higher and 150° C. or lower.

Heat Treatment

The heat treatment is performed during the surface treatment of the untreated metatitanic acid particles or after the surface treatment of the untreated metatitanic acid particles.

The heat treatment may be performed when the untreated metatitanic acid particles are surface-treated with the metal compound having a hydrocarbon group, when the drying treatment after the surface treatment is performed, or separately after the drying treatment. To sufficiently react the metatitanic acid particles with the metal compound having a hydrocarbon group before the heat treatment, the heat treatment is preferably performed when the drying treatment after the surface treatment is performed, or separately after the drying treatment. To effectively perform the drying treatment, the heat treatment is more preferably performed separately after the drying treatment.

To provide a high photocatalytic function and improved dispersibility, the temperature of the heat treatment is preferably 180° C. or higher and 500° C. or lower, more preferably 200° C. or higher and 450° C. or lower, still more preferably 250° C. or higher and 400° C. or lower. To provide a high photocatalytic function and improved dispersibility, the time of the heat treatment is preferably 10 minutes or longer and 300 minutes or shorter, more preferably 30 minutes or longer and 120 minutes or shorter. When the heat treatment is performed during the surface treatment of the untreated metatitanic acid particles, the heat treatment is preferably performed at the above-described heat-treatment temperature after the metal compound having a hydrocarbon group is sufficiently reacted at the above-described surface treatment temperature. When the heat treatment is performed during the drying treatment after the surface treatment, the drying treatment is performed at a temperature of the heat treatment.

A heat-treatment temperature of 180° C. or higher and 500° C. or lower efficiently provides metatitanic acid particles that exhibit a high photocatalytic function in the visible range. When the heat treatment is performed at 180° C. or higher and 500° C. or lower, metal-compound-derived hydrocarbon groups present on the surface of the metatitanic acid particles may be adequately oxidized, converting some C—C bonds or C=C bonds into C—O bonds or C=O bonds.

The heat treatment is preferably performed in an atmosphere at an oxygen concentration of 1% or more and 21% or less (by volume). A heat treatment in such an oxygen atmosphere may adequately and efficiently oxidize metal-compound-derived hydrocarbon groups present on the surface of the metatitanic acid particles. The oxygen concentration is more preferably 3% or more and 21% or less, still more preferably 5% or more and 21% or less (by volume).

The heat treatment may be performed by any known method such as heating in an electric furnace, a firing furnace (e.g., a roller-hearth kiln or a shuttle kiln), or a radiant heating furnace; or heating using laser beams, infrared rays, UV rays, or microwaves.

Through the above process, the metatitanic acid particles of the exemplary embodiment are suitably obtained.

Composition for Forming Photocatalyst

A composition for forming a photocatalyst according to the exemplary embodiment contains the metatitanic acid particles of the exemplary embodiment and at least one compound selected from a dispersion medium and a binder.

Examples of the form of the composition for forming a photocatalyst according to the exemplary embodiment include a dispersion containing the metatitanic acid particles of the exemplary embodiment and a dispersion medium, and a composition containing the metatitanic acid particles of the exemplary embodiment and an organic or inorganic binder. The dispersion may be in the form of a highly viscous paste.

Examples of the dispersion medium suitable for use include water and organic solvents. Examples of water include water, distilled water, and pure water. Examples of organic solvents include, but are not limited to, hydrocarbon solvents, ester solvents, ether solvents, halogen solvents, and alcohol solvents. From the viewpoint of dispersion stability and storage stability, the dispersion preferably contains at least one compound selected from a dispersant and a surfactant. Known chemical substances are used as the dispersant and the surfactant. The dispersion may contain a binder in the form of an emulsion.

Examples of the binder for use in the composition include, but are not limited to, organic binders such as fluorocarbon resins, silicone resins, polyester resins, acrylic resins, styrene resins, acrylonitrile/styrene copolymer resins, acrylonitrile/butadiene/styrene copolymer (ABS) resins, epoxy resins, polycarbonate resins, polyamide resins, polyamine resins, polyurethane resins, polyether resins, polysulfide resins, polyphenol resins, composites thereof, silicone-modified products thereof, and halogen-modified products thereof; and inorganic binders such as glass, ceramic, and metal powder.

The composition for forming a photocatalyst according to the exemplary embodiment may further contain other components. The other components may be known additives, examples of which include promoters, colorants, fillers, preservatives, antifoaming agents, adhesion improvers, and thickeners.

The metatitanic acid particles of the exemplary embodiment contained in the composition for forming a photocatalyst according to the exemplary embodiment may be of one type or two or more types.

The amount of the metatitanic acid particles of the exemplary embodiment in the composition for forming a photocatalyst according to the exemplary embodiment is not particularly limited and may be appropriately selected in accordance with, for example, the form, such as a dispersion or a resin composition, and the desired photocatalyst amount.

A photocatalyst including the composition for forming a photocatalyst according to the exemplary embodiment or a structure including the photocatalyst may be produced using any known application method. Examples of the method of applying the composition for forming a photocatalyst according to the exemplary embodiment include spin coating, dip coating, flow coating, spray coating, roll coating, brush coating, sponge coating, screen printing, and ink-jet printing.

Photocatalyst and Structure

A photocatalyst according to the exemplary embodiment includes the metatitanic acid particles of the exemplary embodiment or includes the metatitanic acid particles of the exemplary embodiment alone. A structure according to the exemplary embodiment has the metatitanic acid particles of the exemplary embodiment.

The photocatalyst according to the exemplary embodiment may be a photocatalyst including the metatitanic acid particles of the exemplary embodiment alone, a photocatalyst obtained by mixing the metatitanic acid particles of the exemplary embodiment with a promoter, or a photocatalyst obtained by compacting the metatitanic acid particles of the exemplary embodiment into a desired shape with an adhesive or an agglutinant.

The structure according to the exemplary embodiment preferably has the metatitanic acid particles of the exemplary embodiment as a photocatalyst. From the viewpoint of photocatalytic activity, the structure according to the exemplary embodiment preferably has, at least on its surface, the metatitanic acid particles of the exemplary embodiment.

The structure according to the exemplary embodiment is preferably a structure having the metatitanic acid particles of the exemplary embodiment on at least a part of a surface of a substrate, more preferably a structure formed by applying the composition for forming a photocatalyst according to the exemplary embodiment to at least a part of a surface of a substrate. In the structure, the amount of application of the composition for forming a photocatalyst according to the exemplary embodiment is not particularly limited and may be selected as desired.

In the structure according to the exemplary embodiment, the metatitanic acid particles of the exemplary embodiment may be attached or secured to a surface of a substrate. From the viewpoint of durability of the photocatalyst, the metatitanic acid particles are preferably secured. The metatitanic acid particles may be secured by any known method.

Examples of the substrate for use in the exemplary embodiment include various materials such as inorganic materials and organic materials, and the substrate may be of any shape. Examples of suitable substrates include metal, ceramic, glass, plastic, rubber, stone, cement, concrete, fiber, fabric, wood, paper, combinations thereof, laminates thereof, and articles obtained by coating surfaces of these substrates with at least one layer. Examples of suitable substrates viewed from the standpoint of applications include construction materials, exterior materials, window frames, window panes, mirrors, tables, tableware, curtains, lenses, prisms, exteriors and coatings of vehicles, exteriors of machines, exteriors of articles, dust covers and coatings, traffic signs, various displays, advertising columns, noise barriers for roadways, noise barriers for railways, bridges, exteriors and coatings of guardrails, interiors and coatings of tunnels, insulators, solar cell covers, solar collector covers of solar water heaters, polymer films, polymer sheets, filters, indoor signboards, outdoor signboards, vehicle light covers, outdoor lighting fixtures, air cleaners, water purifiers, medical apparatuses, and nursing care items.

EXAMPLES

The exemplary embodiment of the invention will now be described in detail with reference to examples, but these examples are not intended to limit the exemplary embodiment of the invention.

Example 1

Preparation of Metatitanic Acid Slurry

To a titanyl sulfate solution having a $TiO_2$ concentration of 260 g/L and a $Ti^{3+}$ concentration in terms of $TiO_2$ of 6.0 g/L, a separately prepared anatase seed is added in an amount of 8 mass % in terms of $TiO_2$ in the titanyl sulfate solution. The solution is then heated at a temperature higher than or equal to the boiling point of the solution to hydrolyze titanyl sulfate ($TiOSO_4$), thereby forming particulate metatitanic acid. Subsequently, the metatitanic acid particles are filtered, washed, and then processed into a slurry, and the slurry is neutralized and washed at pH 7. In this manner, a metatitanic acid slurry having a volume-average particle size of 42 nm is prepared.

Preparation of Metatitanic Acid Particles

To the metatitanic acid slurry having a volume-average particle size of 42 nm, a 5 N aqueous sodium hydroxide solution is added with stirring to pH 8.5. After being kept stirred for 2 hours, the mixture is neutralized with 6 N hydrochloric acid to pH 5.8, and filtered and washed with water. After the washing, water is added to form a slurry again, and 6 N hydrochloric acid is added to the slurry with stirring to pH 1.3. The resulting slurry is kept stirred for 3 hours. One hundred parts by mass of metatitanic acid is separated from the slurry, and heated and held at 60° C. Under stirring, 30 parts by mass of hexyltrimethoxysilane is added thereto. After being stirred for 30 minutes, the mixture is neutralized with a 7 N aqueous sodium hydroxide solution to pH 7, and filtered and washed with water. The residue from the filtration and washing with water is spray-dried with a flash dryer at an outlet temperature of 150° C. to obtain a dry powder. The dry powder is heat-treated at 360° C. for 90 minutes in an electric furnace set to an oxygen concentration of 12% (by volume) to obtain metatitanic acid particles 1.

Comparative Example 1

The metatitanic acid slurry prepared in Example 1 is spray-dried with a flash dryer at an outlet temperature of 150° C. to obtain metatitanic acid particles C1.

Comparative Example 2

The metatitanic acid slurry prepared in Example 1 is spray-dried with a flash dryer at an outlet temperature of 150° C. to obtain a dry powder. The dry powder is heat-treated under the same conditions as in Example 1 to obtain metatitanic acid particles C2.

Comparative Example 3

Metatitanic acid particles C3 are obtained in the same manner as in Example 1, except that no heat treatments are performed.

Comparative Examples 4 and 5

Metatitanic acid particles C4 and C5 are obtained in the same manner as in Example 1, except that the conditions of heat treatment are changed as shown in Table 1.

Examples 2 to 15

Metatitanic acid particles 2 to 15 are obtained in the same manner as in Example 1, except that the type and amount of metal compound for use in surface treatment and the conditions of heat treatment are changed as shown in Table 1.
Measurement of Characteristics of Metatitanic Acid Particles The metatitanic acid particles obtained in Examples and Comparative Examples are evaluated for ultraviolet-visible absorption spectral characteristics. The metatitanic acid particles of Examples 1 to 15 have absorption over an entire wavelength range of 400 nm to 800 nm. Table 1 shows absorbances at wavelengths of 450 nm, 600 nm, and 750 nm (given as "UV-Vis Characteristics" in Table 1), relative to the absorbance at a wavelength of 350 nm taken as 1. The C is XPS spectrum and the volume-average particle size (given as "D50v" in Table 1) are measured according to the above-described methods.
Property Evaluation of Metatitanic Acid Particles
Photocatalytic Activity To evaluate the photocatalytic activity of the metatitanic acid particles in the visible range, ink degradability (chromatic change) is evaluated as described below.

Metatitanic acid particles obtained in each of Examples and Comparative Examples are dispersed in water containing 4 mass % of methanol to a solids concentration of 2 mass %. The dispersion is then sprayed onto a tile (5 cm square) and dried to attach the metatitanic acid particles uniformly to the surface of the tile. Subsequently, a diluted ink obtained by 15-fold diluting a fountain pen ink (INK-30-R available from Pilot Corporation) with a mixed solution of methanol and water (methanol:water=3:5) is sprayed onto the surface and then dried to prepare a test piece.

Using a light-emitting diode (LED) that emits visible light having a wavelength of 400 nm or more and 800 nm or less (provided that the absorption wavelength range of the ink (450 nm or more and 550 nm or less) is filtered), visible light (10,000 LX (lux)) is continuously applied for 2 hours to the test piece that has just been prepared. When visible light is applied, a five-yen coin is placed on a central part of the irradiation area of the test piece to form a masked portion.

The hue of the test piece that has just been prepared and the test piece that has been irradiated with visible light for 2 hours is measured with a spectrocolorimeter (RM200QC available from X-Rite Inc.) to determine $\Delta E1$ and $\Delta E2$ by the following formulas. Chromaticity E is a value calculated by $E=\{(L^*)^2+(a^*)^2+(b^*)^2\}^{0.5}$, and $L^*$, $a^*$, and $b^*$ are coordinate values based on the L*ab color system.

$\Delta E1$=chromaticity of irradiation area that has continuously been irradiated with visible light for 2 hours–chromaticity of test piece that has just been prepared $\Delta E2$=chromaticity of masked area after continuous irradiation with visible light for 2 hours–chromaticity of test piece that has just been prepared Color change $\Delta E$ is determined from $\Delta E=\Delta E1-\Delta E2$, and degradability is evaluated as follows based on $\Delta E$.
A: good degradability
B: fair degradability
C: poor degradability
Dispersibility In a beaker is placed 0.05 g of the metatitanic acid particles obtained in each of Examples and Comparative Examples, and 40 g of methyl ethyl ketone is added thereto. The mixture is dispersed with an ultrasonic disperser for 10 minutes, and then the particle size distribution is measured with a NANOTRAC UPA-ST (dynamic light scattering particle size analyzer available from MicrotracBEL Corp.) to classify the volume particle size distribution profile as follows.

A: The volume particle size distribution has one peak, indicating good dispersibility.

B: The volume particle size distribution has two peaks, but the peak value of the principal peak is ten or more times larger than that of the other peak, indicating practically acceptable dispersibility.

C: The volume particle size distribution has three or more peaks, indicating poor dispersibility.

TABLE 1

| | | Surface Treatment | | Heat Treatment | | | XPS | | UV-Vis Characteristics | | | Property Evaluation | |
|---|---|---|---|---|---|---|---|---|---|---|---|---|---|
| | | Metal Compound | | | | Oxygen | | Peak | | | | | |
| | Core | Type | Amount [parts by mass] | Temperature [° C.] | Time [min] | Concentration [vol %] | D50v [nm] | Intensity Ratio | 450 nm Absorbance | 600 nm Absorbance | 750 nm Absorbance | Photocatalytic Activity | Dispersibility |
| Example 1 | metatitanic acid | hexyltrimethoxysilane | 30 | 360 | 90 | 12 | 42 | 0.12 | 0.63 | 0.46 | 0.29 | A | A |
| Comparative Example 1 | metatitanic acid | — | | | | | 42 | 0.01 | 0 | 0 | 0 | C | C |
| Comparative Example 2 | metatitanic acid | — | | 360 | 90 | 12 | 42 | 0.01 | 0 | 0 | 0 | C | C |

TABLE 1-continued

| | | Surface Treatment | | Heat Treatment | | | XPS | | UV-Vis Characteristics | | | Property Evaluation | |
|---|---|---|---|---|---|---|---|---|---|---|---|---|---|
| | | Metal Compound | | | | Oxygen | | Peak | | | | | |
| | Core | Type | Amount [parts by mass] | Temperature [° C.] | Time [min] | Concentration [vol %] | D50v [nm] | Intensity Ratio | 450 nm Absorbance | 600 nm Absorbance | 750 nm Absorbance | Photocatalytic Activity | Dispersibility |
| Comparative Example 3 | metatitanic acid | hexyltrimethoxysilane | 30 | | | — | 42 | 0.02 | 0 | 0 | 0 | C | B |
| Comparative Example 4 | metatitanic acid | hexyltrimethoxysilane | 30 | 160 | 90 | 12 | 42 | 0.02 | 0 | 0 | 0 | C | B |
| Comparative Example 5 | metatitanic acid | hexyltrimethoxysilane | 30 | 600 | 90 | 12 | 42 | 0.33 | 0 | 0 | 0 | C | B |
| Example 2 | metatitanic acid | isobutyltrimethoxysilane | 30 | 360 | 90 | 12 | 42 | 0.09 | 0.44 | 0.33 | 0.25 | A | A |
| Example 3 | metatitanic acid | decyltrimethoxysilane | 30 | 360 | 90 | 12 | 42 | 0.16 | 0.42 | 0.28 | 0.15 | A | A |
| Example 4 | metatitanic acid | methyltrimethoxysilane | 25 | 360 | 90 | 12 | 41 | 0.06 | 0.34 | 0.25 | 0.16 | A | B |
| Example 5 | metatitanic acid | dodecyltrimethoxysilane | 50 | 360 | 90 | 12 | 43 | 0.15 | 0.35 | 0.23 | 0.14 | B | A |
| Example 6 | metatitanic acid | octadecyltrimethoxysilane | 30 | 360 | 90 | 12 | 42 | 0.18 | 0.38 | 0.3 | 0.15 | A | A |
| Example 7 | metatitanic acid | hexamethyldisilazane | 30 | 180 | 90 | 12 | 42 | 0.03 | 0.36 | 0.26 | 0.11 | B | A |
| Example 8 | metatitanic acid | octyltrimethoxysilane | 30 | 500 | 90 | 12 | 42 | 0.28 | 0.58 | 0.44 | 0.23 | A | B |
| Example 9 | metatitanic acid | phenyltrimethoxysilane | 30 | 360 | 90 | 12 | 42 | 0.11 | 0.31 | 0.19 | 0.1 | A | A |
| Example 10 | metatitanic acid | acetoalkoxyaluminum diisopropylate | 30 | 360 | 90 | 12 | 42 | 0.07 | 0.27 | 0.11 | 0.07 | B | B |
| Example 11 | metatitanic acid | isopropyl triisostearoyl titanate | 30 | 360 | 90 | 12 | 42 | 0.06 | 0.26 | 0.1 | 0.06 | B | B |
| Example 12 | metatitanic acid | hexyltrimethoxysilane | 30 | 360 | 90 | 5 | 42 | 0.12 | 0.56 | 0.44 | 0.23 | A | A |
| Example 13 | metatitanic acid | hexyltrimethoxysilane | 30 | 360 | 90 | 20 | 42 | 0.21 | 0.58 | 0.45 | 0.23 | A | A |
| Example 14 | metatitanic acid | hexyltrimethoxysilane | 30 | 360 | 60 | 12 | 42 | 0.21 | 0.5 | 0.42 | 0.19 | A | A |
| Example 15 | metatitanic acid | hexyltrimethoxysilane | 30 | 360 | 120 | 12 | 42 | 0.21 | 0.59 | 0.45 | 0.24 | A | A |

Metal compounds shown in Table 1 are detailed as follows.

Acetoalkoxyaluminum diisopropylate: Plainact AL-M available from Ajinomoto Co., Inc.

Isopropyl triisostearoyl titanate: Plainact TTS available from Ajinomoto Co., Inc.

As may be seen from the results of property evaluation shown in Table 1, the photocatalytic activity in the visible range is higher in Examples than in Comparative Examples. In Examples, sufficient dispersibility is also achieved.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. Treated metatitanic acid particles, wherein each treated metatitanic acid particle comprises:

a particle containing metatitanic acid ($TiO(OH)_2$); and
a metal compound bonded to a surface of the particle via an oxygen atom, the metal compound includes a metal atom and a hydrocarbon group, wherein the metal atom is silicon, aluminum, or titanium, wherein the treated metatitanic acid particles:
(i) have absorption at wavelengths of 450 nm and 750 nm in a visible absorption spectrum,
(ii) satisfy the following inequality:

$$0.03 \leq A \leq 0.3$$

wherein A represents a value of {(peak intensity of C—O bond+peak intensity of C=O bond)/(peak intensity of C—C bond+peak intensity of C=C bond} in a C is orbital X-ray Photoelectron Spectroscopy spectrum, and
(iii) have undergone heat treatment at a temperature in a range of 180° C. or higher and 500° C. or lower.

2. The treated metatitanic acid particles according to claim 1, wherein the metal compound has a carbon atom in the hydrocarbon group being directly bonded to the metal atom.

3. The treated metatitanic acid particles according to claim 1, wherein the metal atom is a silicon atom.

4. The treated metatitanic acid particles according to claim 1, wherein the treated metatitanic acid particles have a volume-average particle size in a range of 10 nm to 1 μm.

5. The treated metatitanic acid particles according to claim 1, wherein the value of A is in a range of 0.04 to 0.25.

6. The treated metatitanic acid particles according to claim 1, wherein the value of A is in a range of 0.05 to 0.20.

7. The treated metatitanic acid particles according to claim 1, wherein the hydrocarbon group is a saturated or unsaturated aliphatic hydrocarbon group of 1 to 20 carbon atoms or an aromatic hydrocarbon group.

8. The treated metatitanic acid particles according to claim 1, wherein the hydrocarbon group is a saturated aliphatic hydrocarbon group.

9. A method for producing the treated metatitanic acid particles according to claim 1, the method comprising:
surface-treating untreated metatitanic acid particles with the metal compound having the metal atom and the hydrocarbon group; and
heat-treating the metatitanic acid particles during or after the surface-treating of the untreated metatitanic acid particles, wherein the metatitanic acid particles are heat treated at a temperature in a range of 180° C. or higher and 500° C. or lower to form the treated metatitanic acid particles.

10. The method according to claim 9, wherein the metal compound has the hydrocarbon group directly bonded to the metal atom.

11. The method according to claim 9, wherein the metal atom is a silicon atom.

12. The method according to claim 9, wherein the hydrocarbon group is a saturated or unsaturated aliphatic hydrocarbon group of 1 to 20 carbon atoms or an aromatic hydrocarbon group.

13. The method according to claim 9, wherein the hydrocarbon group is a saturated aliphatic hydrocarbon group of 1 to 20 carbon atoms.

14. The method according to claim 9, wherein the hydrocarbon group is a saturated aliphatic hydrocarbon group of 4 to 10 carbon atoms.

15. A composition for forming a photocatalyst, the composition comprising:
the treated metatitanic acid particles according to claim 1; and
at least one compound selected from the group consisting of a dispersion medium and a binder.

16. The treated metatitanic acid particles according to claim 1, wherein the treated metatitanic acid particles have undergone heat treatment at a temperature in a range of 180° C. or higher and 400° C. or lower.

17. The treated metatitanic acid particles according to claim 1, wherein the metal compound is at least one selected from the group consisting of an alkyl aluminate, an aluminum chelate, an aluminate coupling agent, a titanate coupling agent, a titanium chelate, and a silane compound having a hydrocarbon group.

* * * * *